(12) United States Patent
Pfeifer et al.

(10) Patent No.: US 11,390,156 B2
(45) Date of Patent: Jul. 19, 2022

(54) MODULAR HYBRID TRANSMISSION

(71) Applicant: Schaeffler Technologies AG & Co. KG, Herzogenaurach (DE)

(72) Inventors: Jacob G. Pfeifer, Salem, OH (US); John Ramsey, Mansfield, OH (US); Matthew A. Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/884,208

(22) Filed: May 27, 2020

(65) Prior Publication Data

US 2021/0370757 A1   Dec. 2, 2021

(51) Int. Cl.
*B60K 6/50*         (2007.10)
*B60K 17/10*        (2006.01)
(Continued)

(52) U.S. Cl.
CPC ............... *B60K 6/50* (2013.01); *B60K 6/26* (2013.01); *B60K 6/405* (2013.01); *B60K 17/10* (2013.01);
(Continued)

(58) Field of Classification Search
CPC . B60K 6/26; B60K 6/405; B60K 6/50; B60K 17/10; B60Y 2200/92; F16H 41/24;
(Continued)

(56) References Cited

U.S. PATENT DOCUMENTS

2011/0121692 A1* 5/2011 Iwase .................. B60K 6/48
                                                              192/85.01
2013/0192946 A1   8/2013 Frait et al.
(Continued)

FOREIGN PATENT DOCUMENTS

CN        102588464        4/2016
DE   102018116587 A1 *   1/2019  ............ F16D 25/10
(Continued)

OTHER PUBLICATIONS

Reimnitz et al., English Machine Translation of WO 2018/113819 (Year: 2018).*

(Continued)

*Primary Examiner* — Rashad H Johnson
(74) *Attorney, Agent, or Firm* — Volpe Koenig

(57) ABSTRACT

A modular hybrid transmission that provides for an improved support of the rotor as well as an improved cooling layout for the stator. The modular hybrid transmission has a rotating assembly and a housing assembly. The rotating assembly includes a rotor assembly, a rotor carrier hub that supports the rotor, and an input shaft. The rotor carrier is rotationally fixed on the input shaft. The housing assembly houses the rotating assembly, and includes a housing having an outer wall, a stator assembly connected to the outer wall, and a radially extending stationary wall that extends from the outer wall toward the output shaft. The stationary wall includes an axially extending wall portion that extends parallel to an outer surface of the input shaft, and a radial ball bearing supports the input shaft on this axially extending wall portion. Two stator cooling paths are channeled in the housing.

18 Claims, 3 Drawing Sheets

(51) Int. Cl.
*B60K 6/26* (2007.10)
*B60K 6/405* (2007.10)
*H02K 5/173* (2006.01)
*H02K 5/20* (2006.01)
*H02K 7/075* (2006.01)
*H02K 7/08* (2006.01)
*H02K 7/10* (2006.01)
*H02K 9/19* (2006.01)
*H02K 11/21* (2016.01)
*H02K 24/00* (2006.01)
*F16H 41/24* (2006.01)

(52) U.S. Cl.
CPC ........... *F16H 41/24* (2013.01); *H02K 5/1735* (2013.01); *H02K 5/20* (2013.01); *H02K 7/075* (2013.01); *H02K 7/085* (2013.01); *H02K 7/10* (2013.01); *H02K 9/19* (2013.01); *H02K 11/21* (2016.01); *H02K 24/00* (2013.01); *B60Y 2200/92* (2013.01); *H02K 2213/12* (2013.01)

(58) Field of Classification Search
CPC ........ H02K 5/1735; H02K 5/20; H02K 7/075; H02K 7/085; H02K 7/10; H02K 9/19; H02K 11/21; H02K 24/00; H02K 2213/12; H02K 1/18; H02K 1/28; H02K 11/225

USPC ................. 310/54, 75 R, 112, 114, 68 B
See application file for complete search history.

(56) References Cited

U.S. PATENT DOCUMENTS

| | | | |
|---|---|---|---|
| 2019/0054817 A1* | 2/2019 | Garcia | B60K 17/16 |
| 2019/0128394 A1* | 5/2019 | Satyaseelan | B60K 6/387 |
| 2019/0190334 A1* | 6/2019 | Payne | B60K 6/48 |
| 2019/0315221 A1* | 10/2019 | Frait | B62D 65/10 |
| 2020/0014283 A1 | 1/2020 | Payne et al. | |
| 2020/0094668 A1 | 3/2020 | Podschwadt et al. | |
| 2021/0348674 A1* | 11/2021 | Nelson | F16H 45/02 |

FOREIGN PATENT DOCUMENTS

| | | | | |
|---|---|---|---|---|
| JP | 2007230341 | | 9/2007 | |
| WO | WO-2018113819 A1 * | | 6/2018 | F16D 21/08 |

OTHER PUBLICATIONS

Boulet et al, English Machine Translation of DE102018116587 (Year: 2018).*

* cited by examiner

MODULAR HYBRID TRANSMISSION

FIELD OF INVENTION

The present disclosure relates to a drive arrangement for a modular hybrid transmission.

BACKGROUND

Automotive OEMs and Tier 1 suppliers to OEMs have been considering different major powertrain architectures for MHEVs (Mild Hybrid Electric Vehicles). In these architectures, the electric motor can be positioned relative to the other powertrain components at five major points, referred to as P0 to P4. As shown in FIG. 3, P0 is located at the front end of the ICE (internal combustion engine), and is typically a front end accessory drive that provides power to the crankshaft via a belt. P1 provides for a direct connection to the crankshaft of the electric motor. P0 and P1 architectures do not allow mechanical disconnection of the electric motors from the ICE. P2 architecture provides a side attached electric motor between the ICE and the transmission that is disconnectable from the ICE. P3 architecture provides for an electric motor that is connected to the transmission via intermeshing gears. Finally, P4 architecture provides for an electric motor that is connected to the drive axle via intermeshing gears. The P2-P4 architectures all allow the electric motor to be disconnected from the ICE.

P1 architectures have been used in the automotive industry and can be found in some small passenger cars where the e-motor is directly connected to the crankshaft before the vehicle transmission and downstream drive line. Such arrangements provide a rotor of the hybrid electric motor mounted to an input shaft that is supported in a pilot of the crankshaft, with the rotor being centered in the stator. However, pre-mature contact can occur between the rotor and stator of the e-motor due to insufficient support which results in loss of function. Like in the MHT (modular hybrid transmission) where the bearing is farther away from the central axial location of the rotor, the tilting allowance from the radial ball bearing can also lead to premature contact between the rotor and stator due to the bearing being closer towards the engine side in the case of the MHT.

In many vehicle applications, it is also not possible to package an on-board e-drive system such that conventional vehicle powertrain architecture can be utilized with the e-drive. Off-axis solutions often consume space where the floor board of the vehicle resides requiring costly tear up to existing tools and dies. P0 applications have the problem of torque transfer via the serpentine belt and therefore cannot be used for high torque harvest or high vehicle boost limiting the effectiveness of the location of the motor.

A further issue in the known P1 architectures is cooling of the stator. In many of these applications, the stator is cooled with a singular dedicated cooling system. However, this may not be sufficient depending on the load. One known solution uses two different cooling paths for delivering oil/transmission fluid to the stator. Oil is passed down to orifices in a welded plate on the transmission side that will spray oil onto the stator windings in a number of locations. On the engine side, a cast pocket has cooling oil that fills the channel and the oil is sprayed through a number of orifices drilled in the housing onto the stator windings.

It would be desirable to provide electrification for a platform mainly for boost purposes and without the need for a complex P2 architecture. It would also be desirable to provide such an arrangement in a compact and simple manner while still providing for the possibility of additional cooling for the stator coils.

SUMMARY

The present disclosure provides a modular hybrid transmission having a rotating assembly and a housing assembly. The rotating assembly includes a rotor assembly adapted for connection to a torque converter, a rotor carrier hub that supports the rotor, and an input shaft. The rotor carrier is rotationally fixed on the input shaft, and the input shaft has a front end that is configured to be supported by a crankshaft. The input shaft is configured to be driven by the crankshaft. The housing assembly houses the rotating assembly, and includes a housing having an outer wall, a stator assembly connected to the outer wall that is adapted to drive the rotor, and a radially extending stationary wall that extends from the outer wall toward the input shaft. The stationary wall includes an axially extending wall portion that extends parallel to an outer surface of the input shaft, and a radial ball bearing supports the input shaft on this axially extending wall portion. The radial ball bearing is preferably located axially aligned with the rotor.

In another aspect, a seal is provided between the stationary wall and the input shaft that separates a wet area on one side of the stationary wall from a dry area on an opposite side of the stationary wall.

In one arrangement, a damper assembly drivingly connects the input shaft to the crankshaft. A roller bearing can be located on a front end of the input shaft that is supported in the pilot of the crankshaft.

In one arrangement, a resolver rotor is connected to the rotor carrier hub and a resolver stator, which senses the position of the resolver rotor, is connected to the stationary wall. The resolver rotor can be connected to an inner diameter (ID) of the rotor carrier hub with a pressed in ring.

In one arrangement, a retainer ring connected to the input shaft that holds the radial ball bearing in place.

To allow torque transfer, a P1 module adapter plate and a P1 module flex plate are connected to the input shaft and configured for connection to a torque converter. The P1 module flex plate is connected to a splined flange that is retained to the input shaft with a retaining ring.

In one arrangement, an end ring that retains the rotor assembly on the rotor carrier hub.

This new P1 configuration lessens the occurrence of pre-mature contact between the rotor and stator of the e-motor. This configuration also uses axial space under the rotor carrier hub inner diameter with the stationary wall coming down between the two rotating assemblies to make the connection to the bearing which limits any axial length increase for packaging of an out-runner style resolver rotor and resolver stator.

This bearing layout allows for better positioning of the rotor to the stator. It prevents the occurrence of pre-mature contact between the rotor and stator of the e-motor which would result in loss of function. The bearing's axial location in reference to the rotor stack also allows for improved function of the motor as the bearing will tilt to compensate for misalignment during operation. This layout also utilizes less axial space and therefore lessens the need to increase the axial length of the powertrain to include the module by bringing the supporting stationary component underneath the rotating assembly.

With respect to addressing the known cooling issue for the stator coils, the disclosure provides a modular hybrid transmission including a rotating assembly and a housing assembly. The rotating assembly has a rotor assembly adapted for connection to a torque converter, a rotor carrier hub that supports the rotor, and an input shaft. The rotor carrier is rotationally fixed on the input shaft, and the input shaft has a front end that is configured to be supported by a crankshaft. The input shaft is configured to be driven by the crankshaft. The housing assembly houses the rotating assembly and has a housing with an outer wall. A stator assembly is connected to the outer wall and is adapted to drive the rotor. A radially extending stationary wall extends from the outer wall toward the input shaft. A cooling water port is provided in the housing outer wall, and the cooling water port is connected to a housing pocket that extends adjacent to the stator assembly.

In one aspect, a cooling oil port is provided in the housing outer wall, a plate is connected to the stationary wall to define a cooling oil channel in communication with the cooling oil port, and orifices are defined in the stationary wall adjacent to windings of the stator assembly that are configured to spray cooling oil on the stator windings on the side of the transmission.

In a further aspect, a pocket is defined in the housing outer wall on an axially opposite side from the stationary wall, and front orifices in the housing outer wall are in fluid communication with the pocket and are configured to direct cooling oil onto the stator windings on an engine side. A front plate can be used to seal the pocket.

This cooling layout increases the performance capability of the e-motor by having additional dedicated cooling for the e-motor. This is done by both water jacket cooling of the stator steel laminations and oil spray onto the stator windings. The oil cooling for the stator windings is done through the orifices and cross drilled holes in the housing and the plates that are sealed to the housing. These plates can be welded on.

The bearing arrangement and cooling layout can be used separately or together.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
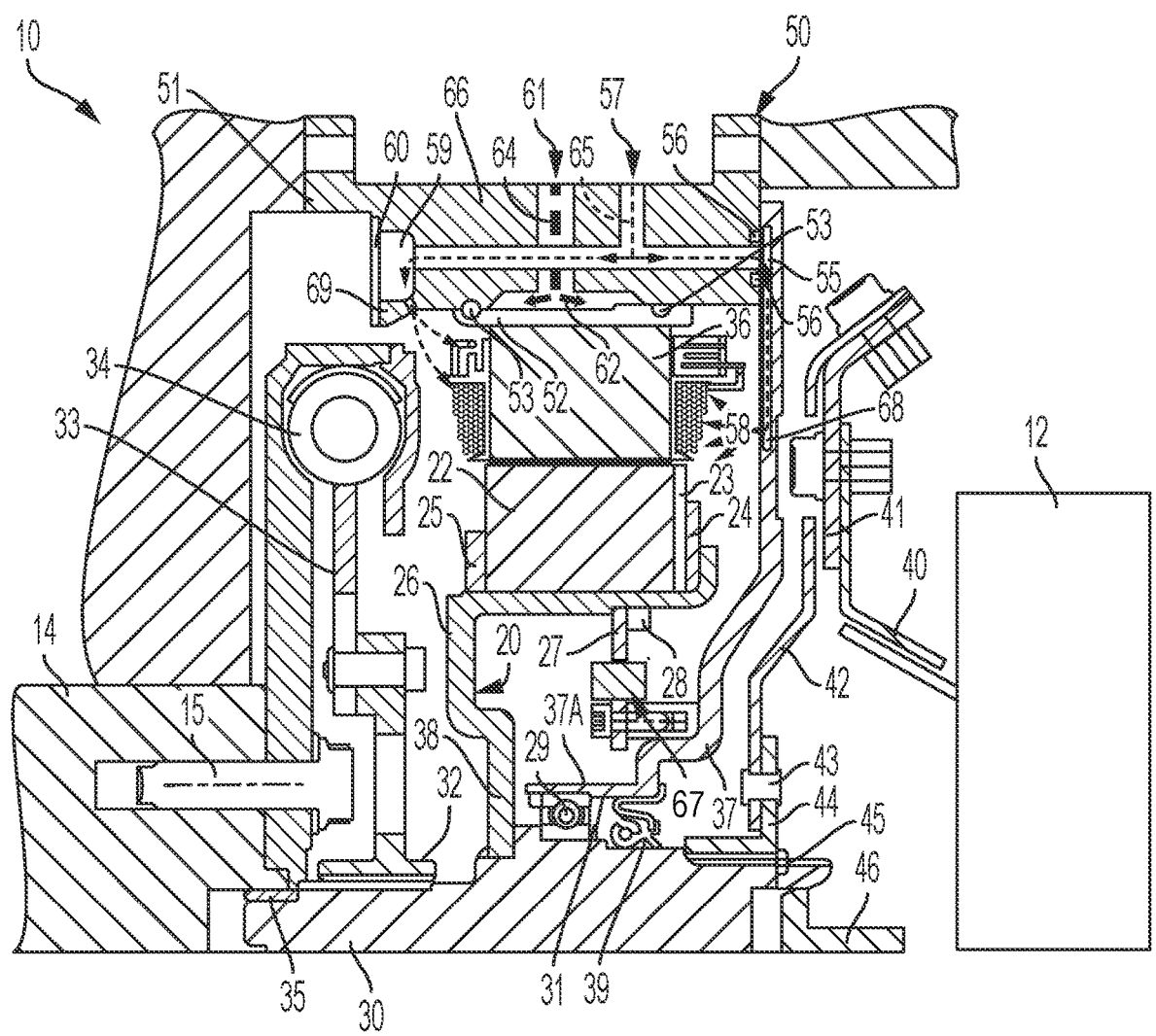
FIG. 1 is a half-cross-sectional view through an assembled drive arrangement.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The term e-machine is used generally herein to refer to an electric motor, such as a motor including a rotor, stator with windings, resolver, etc., used here in connection with a hybrid drive system.

Figure 2:
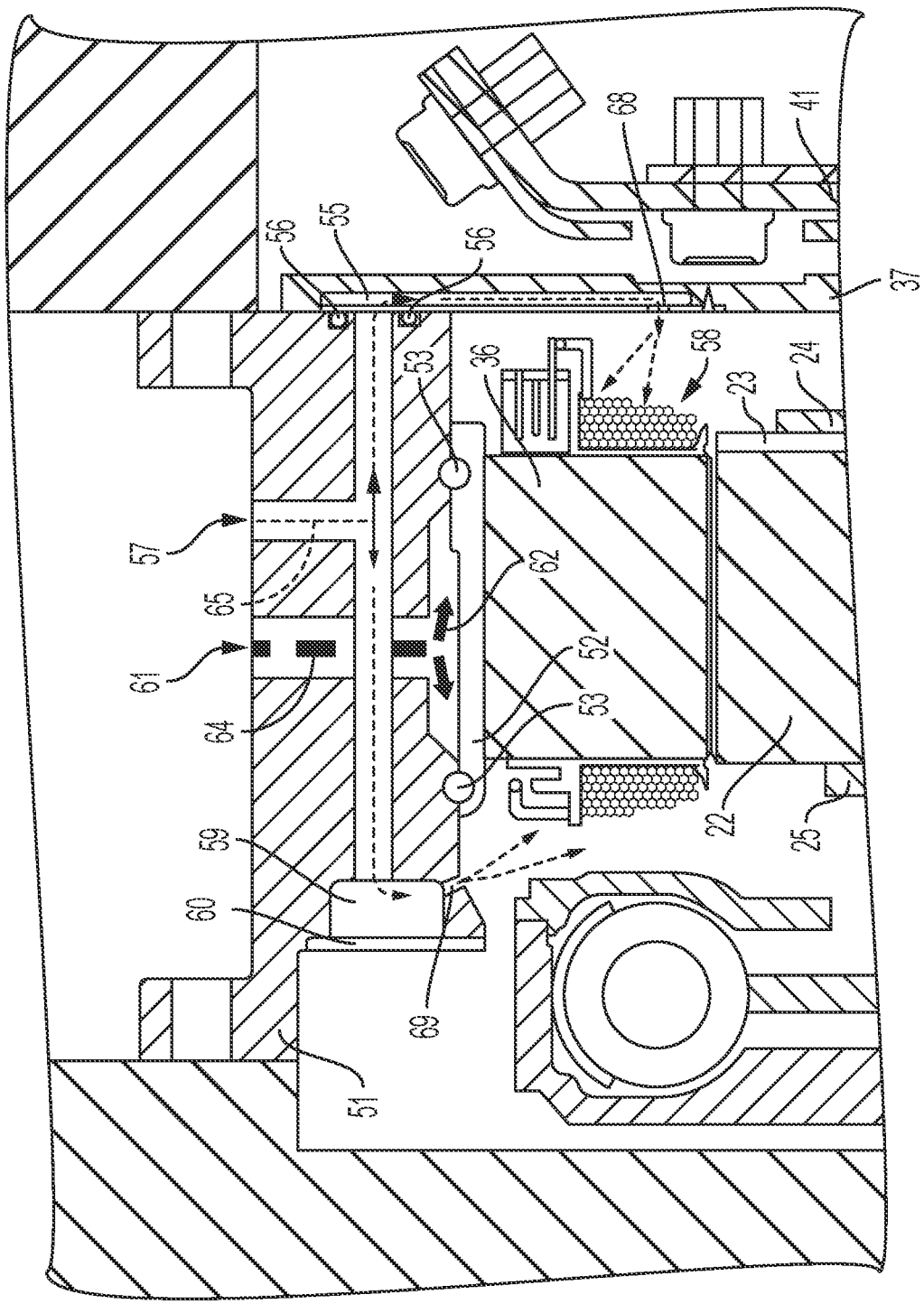
FIG. 2 is an enlarged portion of FIG. 1.
Figure 3:
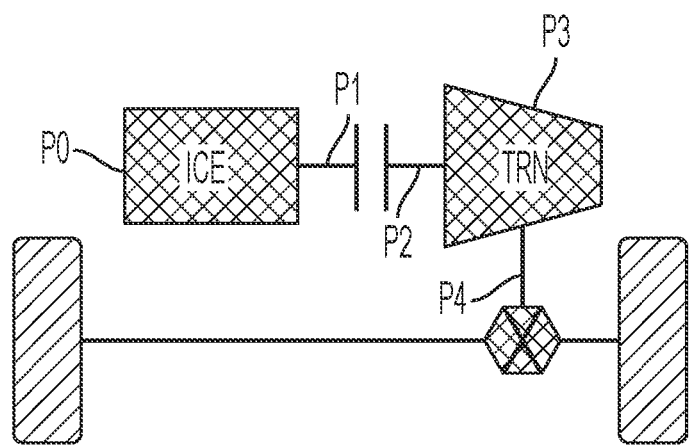
FIG. 3 is a prior art schematic view that describes various MHEV architectures.

Referring to FIGS. 1-2, a modular hybrid transmission 10 is shown that includes rotating assembly 20 and a housing assembly 50. The rotating assembly 20 is configured to be connected to a crankshaft 14 of an internal combustion engine at a first end, and is configured for connection to a torque converter 12 (shown schematically) at the other end.

The rotating assembly 20 includes a rotor assembly 22, made up of lamination stacks, which is axially constrained between a plate 23, which can be made of aluminum, a diaphragm spring 24, an end ring 25, which can be made of steel, which are located on a rotor carrier hub 26. The end ring 25 retains the rotor 22 on the rotor carrier hub 26, which supports the rotor 22.

An input shaft 30 is provided, and the rotor carrier hub 26 is held rotationally fixed on the input shaft 30, preferably via a welded connection. The input shaft 30 has a front end that is configured to be supported by the crankshaft 14 and is preferably supported by a needle bearing 35 which is pressed into the crank pilot. The rotor carrier hub 26 is connected to the input shaft 30 for torque transfer which comes from the crankshaft 14, for example through the splined flange 32 of a damper assembly 33 with damper springs 34 which has a bolted connection to the crankshaft 14 via bolts 15. The input shaft 30 is also held in a centered position via a radial ball bearing 29 which is pressed onto the input shaft 30, and is explained in more detail below. A retainer ring 31 can be connected to the input shaft 30 to hold the radial ball bearing 29 in place.

The housing assembly 50 houses the rotating assembly 20. The housing assembly includes a housing 51 having an outer wall 66, as well as a stator assembly 36 connected to the outer wall 66 that is adapted to drive the rotor 22. A radially extending stationary wall 37 extends from the outer wall 66 toward the input shaft 30, and includes an axially extending wall portion 37A that extends parallel to an outer surface of the input shaft 30. The radial ball bearing 29 supports the input shaft 30 here on this axially extending wall portion 37A. The rotor 22 is centered to the stator assembly 36 through the shoulder of the stationary wall 37 which holds the radial ball bearing in place with a staked on retaining ring 38. The stator 36 is made up mainly of stacked laminations and copper wire windings 58.

A resolver rotor 27 can be assembled at the ID of the rotor carrier hub 26 with a pressed in ring 28 to secure the resolver rotor to the rotor carrier hub 26. A resolver stator 67, which senses the position of the resolver rotor 27 and therefore the rotor 22, is connected to the stationary wall 37.

A seal 39 is located between the stationary wall 37 and the input shaft 30 that separates a wet area on one side of the stationary wall 37 from a dry area on an opposite side of the stationary wall 37. The seal 39 is a dynamic seal between the wall 37 and the input shaft 30, and is located between the bearing 29 and the torque converter drive plate 40 which has a P1 module adapter plate 41 connected, preferably bolted with a number of bolted connections, to the P1 module flex plate 42. The P1 module flex plate 42 is connected, preferably with mechanical fasteners, such as rivets 43 to a splined flange 44 which is retained to the input shaft 30 with a retaining ring 45. The splined portions on the input shaft 30 on both the engine side and transmission side provide the torque transfer from the engine and e-motor to the transmission.

The input shaft 30 preferably also has a bore which centers on the torque converter pilot 46.

The housing 51 preferably also includes a high voltage and low voltage header connection (both not pictured) assembled to it as well as the stator carrier 52 that is sealed to the housing outer wall 66 with O-rings 53. The stationary wall 37 is bolted on to the housing outer wall 66. A plate 55 is connected, preferably laser welded, to the stationary wall 37 to define a flow channel therebetween, and is also sealed with O-rings 56 to the housing outer wall 66. A channel through the stationary wall allows oil to come through a port 57 in the housing outer wall 66 and flow down to orifices 68 in the welded plate to spray oil on the stator windings 58 of the stator 36, as indicated by arrows. Oil spray is also available through the same port traveling to the transmission side to a pocket 59 in the housing outer wall 66 with orifices 69 drilled in the pocket 59 to spray oil onto the stator windings 58 on the engine side, Here, the pocket 59 is shown as being sealed with a bolted plate 60.

Additional cooling is also available by cooling fluid that is circulated through another port 61 in the housing outer wall 66 that extends to the stator carrier 52 where a pocket 62 is defined that cools the stator 36 through the stator carrier 52.

The additional bearing support arrangement using the radial bearing 29 can be used separately from or together with the cooling layout.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

Drive Arrangement 10
Torque converter 12
Crankshaft 14
Bolt 15
Rotating assembly 20
rotor assembly 22
aluminum plate 23
diaphragm spring 24
steel end ring 25
rotor carrier hub 26
resolver rotor 27
ring 28
radial ball bearing 29
input shaft 30
snap ring 31
splined flange 32
damper assembly 33
damper springs 34
needle bearing 35
stator assembly 36
stationary wall 37
retaining ring 38
dynamic seal 39
torque converter drive plate 40
P1 module adapter plate 41
P1 module flex plate 42
riveted connection 43
splined flange 44
retaining ring 45
torque converter pilot 46
Housing assembly 50
housing 51
stator carrier 52
O-rings 53
laser welded plate 55
O-rings for sealing 56
port 57
stator windings 58
pocket 59
bolted plate 60
cooling water port 61
housing pocket 62
cooling water 64
cooling oil 65
housing outer wall 66
resolver stator 67
orifices 68
orifices 69

What is claimed is:

1. A modular hybrid transmission, comprising:
   a rotating assembly including:
      a rotor assembly with a rotor adapted for connection to a torque converter,
      a rotor carrier hub that supports the rotor, and
      an input shaft, the rotor carrier hub being rotationally fixed on the input shaft, and the input shaft having a front end that is configured to be supported in an end of a crankshaft and the input shaft is configured to be drivingly connected to the crankshaft;
   a housing assembly which houses the rotating assembly, the housing assembly including:
      a housing having an outer wall,
      a stator assembly connected to the outer wall that is adapted to drive the rotor, and
      a radially extending stationary wall that extends from the outer wall on a transmission side of the rotor, that is axially opposite from a crankshaft side of the rotor, toward the input shaft and including an axially extending wall portion that extends parallel to an outer surface of the input shaft; and
   a radial ball bearing that supports the input shaft on the axially extending wall portion.

2. The modular hybrid transmission according to claim 1, further comprising a seal between the stationary wall and the input shaft that separates a wet area on a crankshaft side of the stationary wall from a dry area on an opposite side of the stationary wall.

3. The modular hybrid transmission according to claim 1, further comprising a damper assembly that is adapted to drivingly connect the input shaft to the crankshaft.

4. The modular hybrid transmission according to claim 1, further comprising a needle bearing on a front end of the input shaft.

5. The modular hybrid transmission according to claim 1, further comprising a resolver rotor connected to the rotor carrier hub and resolver stator, which senses a position of the resolver rotor and therefore the rotor, connected to the stationary wall.

6. The modular hybrid transmission according to claim 5, wherein the resolver rotor is connected to an ID of the rotor carrier hub with a pressed in ring.

7. The modular hybrid transmission according to claim 1, further comprising a retainer ring fixed on the input shaft that holds the radial ball bearing in place.

8. The modular hybrid transmission according to claim 1, further comprising a P1 module adapter plate and a P1 module flex plate connected to the input shaft and configured for connection to a torque converter.

9. The modular hybrid transmission according to claim 8, wherein the P1 module flex plate is connected to a splined flange that is retained to the input shaft with a retaining ring.

10. The modular hybrid transmission according to claim 9, further comprising a cooling oil port in the housing outer wall, a plate connected to the stationary wall to define a cooling oil channel in communication with the cooling oil port, and orifices defined in the stationary wall adjacent to windings of the stator assembly that are configured to spray cooling oil on the stator windings on a transmission side.

11. The modular hybrid transmission according to claim 10, further comprising a pocket defined in the housing outer wall on an axially opposite side from the stationary wall, and front orifices in the housing outer wall in fluid communication with the pocket configured to direct cooling oil onto the stator windings on an engine side.

12. The modular hybrid transmission according to claim 11, further comprising a front plate that seals the pocket.

13. The modular hybrid transmission according to claim 1, further comprising an end ring that retains the rotor on the rotor carrier hub.

14. The modular hybrid transmission according to claim 1, wherein the housing outer wall includes a cooling water port, and the cooling water port is connected to a housing pocket that extends adjacent to the stator assembly.

15. A modular hybrid transmission, comprising:
a rotating assembly including:
a rotor assembly with a rotor adapted for connection to a torque converter,
a rotor carrier hub that supports the rotor, and
an input shaft, the rotor carrier being rotationally fixed on the input shaft, and the input shaft having a front end that is configured to be supported by a crankshaft and the input shaft is configured to be drivingly connected to the crankshaft;
a housing assembly which houses the rotating assembly, the housing assembly including:
a housing having an outer wall,
a stator assembly connected to the outer wall that is adapted to drive the rotor, and
a radially extending stationary wall that extends from the outer wall on a transmission side of the rotor, that is axially opposite from a crankshaft side of the rotor, toward the input shaft; and
a cooling water port in the housing outer wall, and the cooling water port is connected to a housing pocket that extends adjacent to the stator assembly.

16. The modular hybrid transmission according to claim 15, further comprising a cooling oil port in the housing outer wall, a plate connected to the stationary wall to define a cooling oil channel in communication with the cooling oil port, and orifices defined in the stationary wall adjacent to windings of the stator assembly that are configured to spray cooling oil on the stator windings on a transmission side.

17. The modular hybrid transmission according to claim 16, further comprising a pocket defined in the housing outer wall on an axially opposite side from the stationary wall, and front orifices in the housing outer wall in fluid communication with the pocket configured to direct cooling oil onto the stator windings on an engine side.

18. The modular hybrid transmission according to claim 17, further comprising a front plate that seals the pocket.

* * * * *